E. EWEL & S. L. CLEMENT.
WAGON DUMP.
APPLICATION FILED JUNE 19, 1907.

940,447.

Patented Nov. 16, 1909.
4 SHEETS—SHEET 2.

WITNESSES
Edward Thorpe

INVENTORS
Edward Ewel
Sherman L. Clement
BY
Munn & Co.
ATTORNEYS

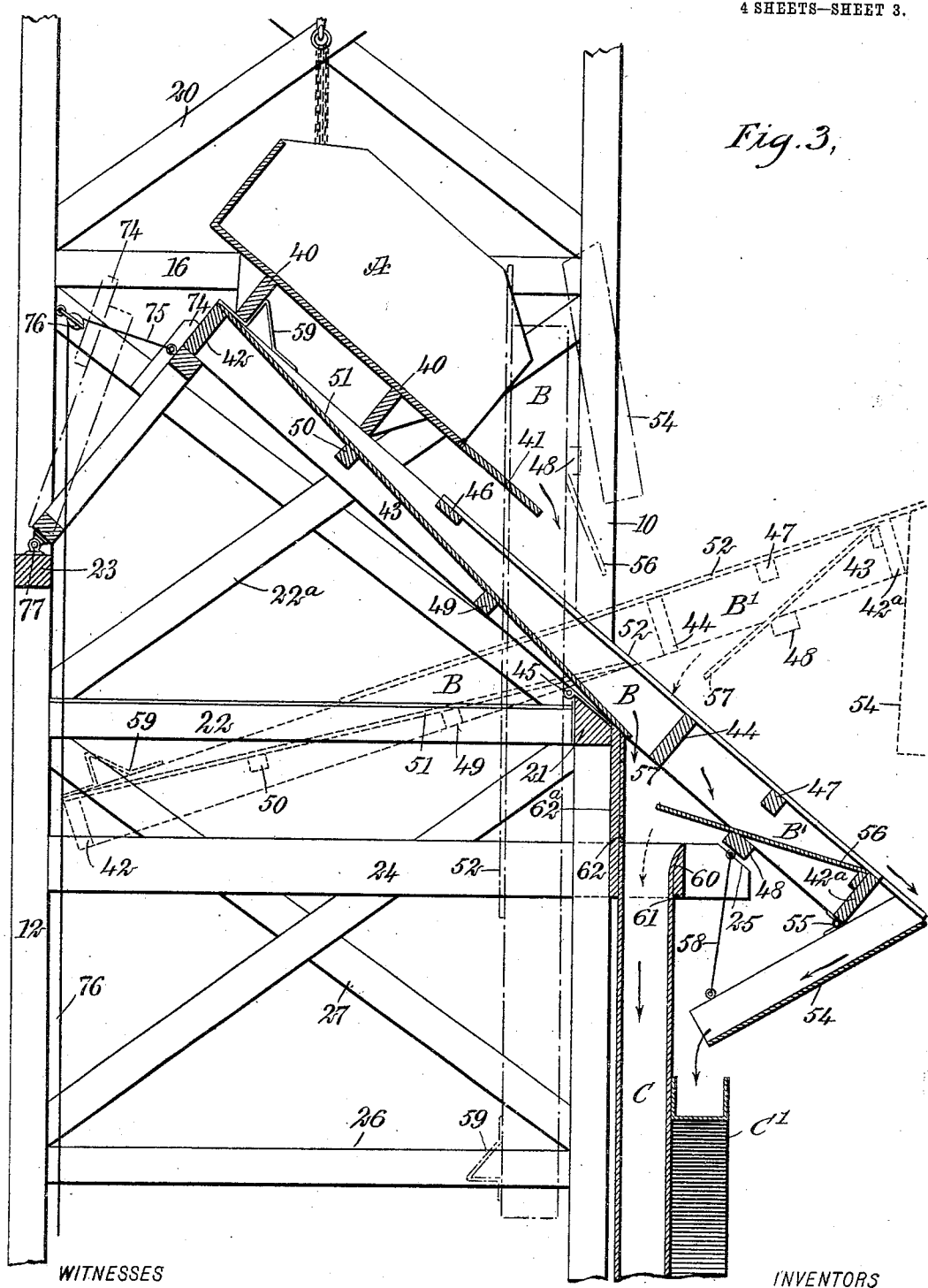

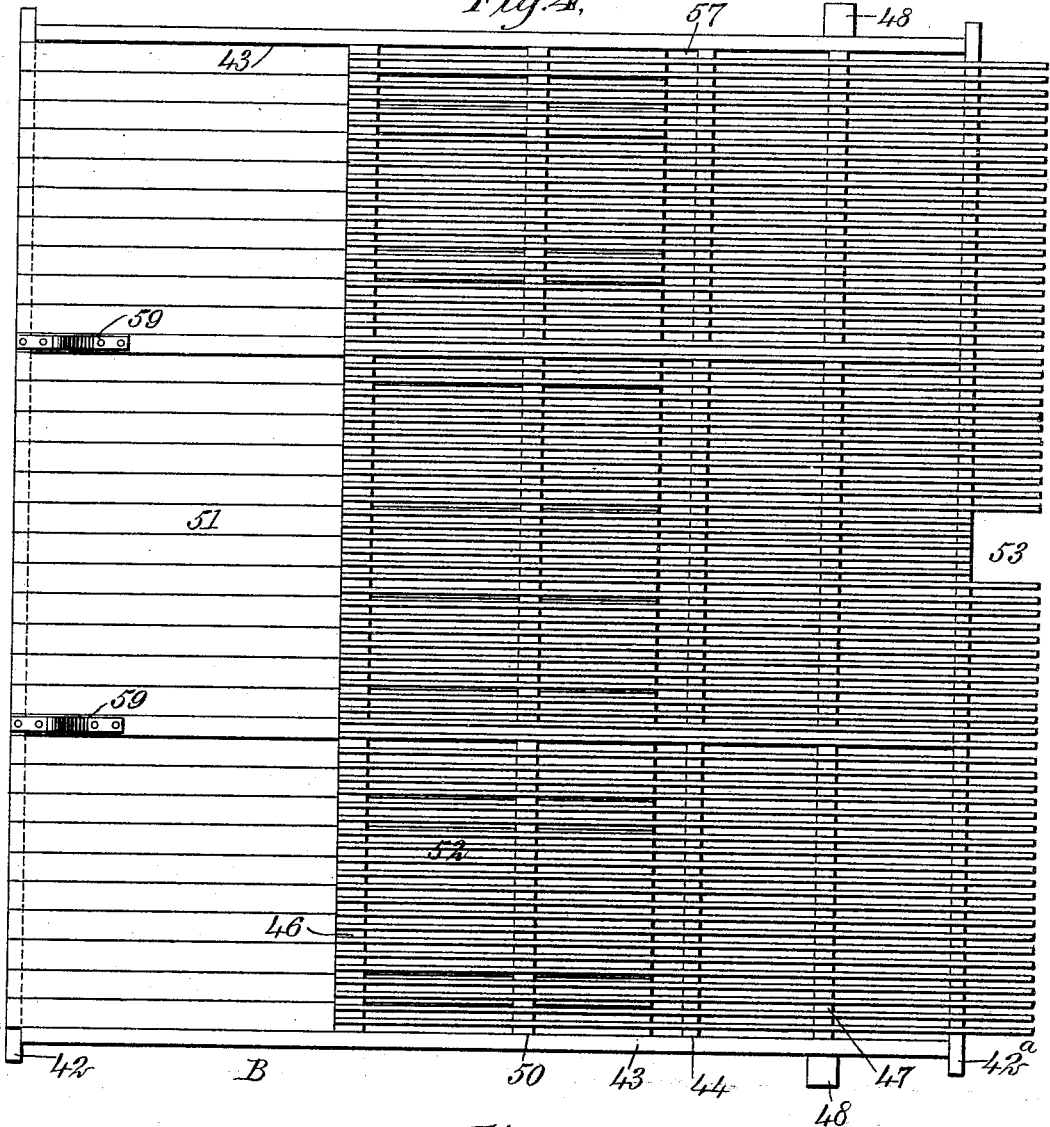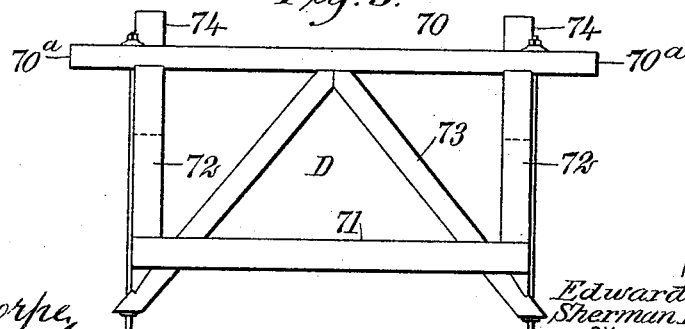

UNITED STATES PATENT OFFICE.

EDWARD EWEL, OF GRAND ISLAND, AND SHERMAN L. CLEMENT, OF NORTH LOUP, NEBRASKA.

WAGON-DUMP.

940,447.

Specification of Letters Patent.

Patented Nov. 16, 1909.

Application filed June 19, 1907. Serial No. 379,774.

*To all whom it may concern:*

Be it known that we, EDWARD EWEL and SHERMAN L. CLEMENT, citizens of the United States, and residents, respectively, of Grand Island, in the county of Hall and State of Nebraska, and North Loup, in the county of Valley and State of Nebraska, have invented a new and useful Improvement in Wagon-Dumps, of which the following is a full, clear, and exact description.

The purpose of the invention is to provide an improvement upon the construction of wagon dump for which application for Letters Patent was filed by us April 13, 1907, Serial No. 367,909, the improvement being such that the device is particularly adapted for side dump wagons, and to provide a means whereby the main chute will receive and support the wagon body when the latter is in dumping position, and means for holding the chute at such time in discharging position and for releasing it from such position after the load is dumped.

It is also a purpose of the invention to provide a screen chute which will deliver the load of beets, corn, or other vegetables to a car to be loaded, free from dirt and extraneous matter, and to provide means for taking the separated dirt and refuse to a receptacle upon scales, thus by weighing the tare the net weight of the load may be quickly ascertained.

It is a further purpose of the invention to so locate the main chute upon the frame of the device that it will not extend very far beyond the front and consequently the device may be placed quite near the tracks.

It is also a purpose of the invention to provide means for separating some of the material from the mass passing over the main chute, and conducting the separated material to a receptacle likewise upon a scale in order that a sample of the material loaded may be retained and the weight of said sample ascertained.

It is another purpose to provide a structure of the character described that will be simple and durable in construction, and means for lifting a loaded wagon body up and placing it in dumping position.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
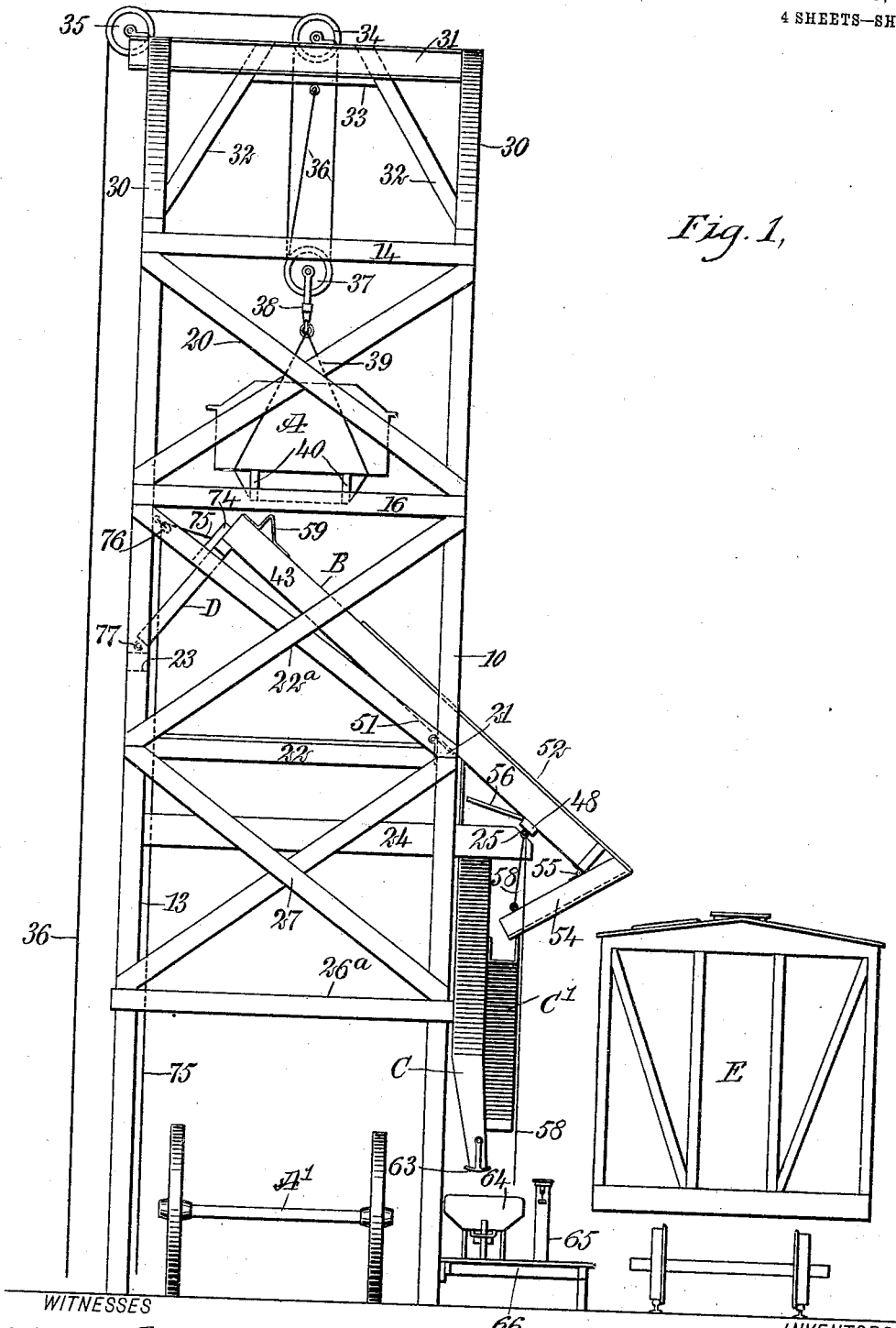
Figure 2:
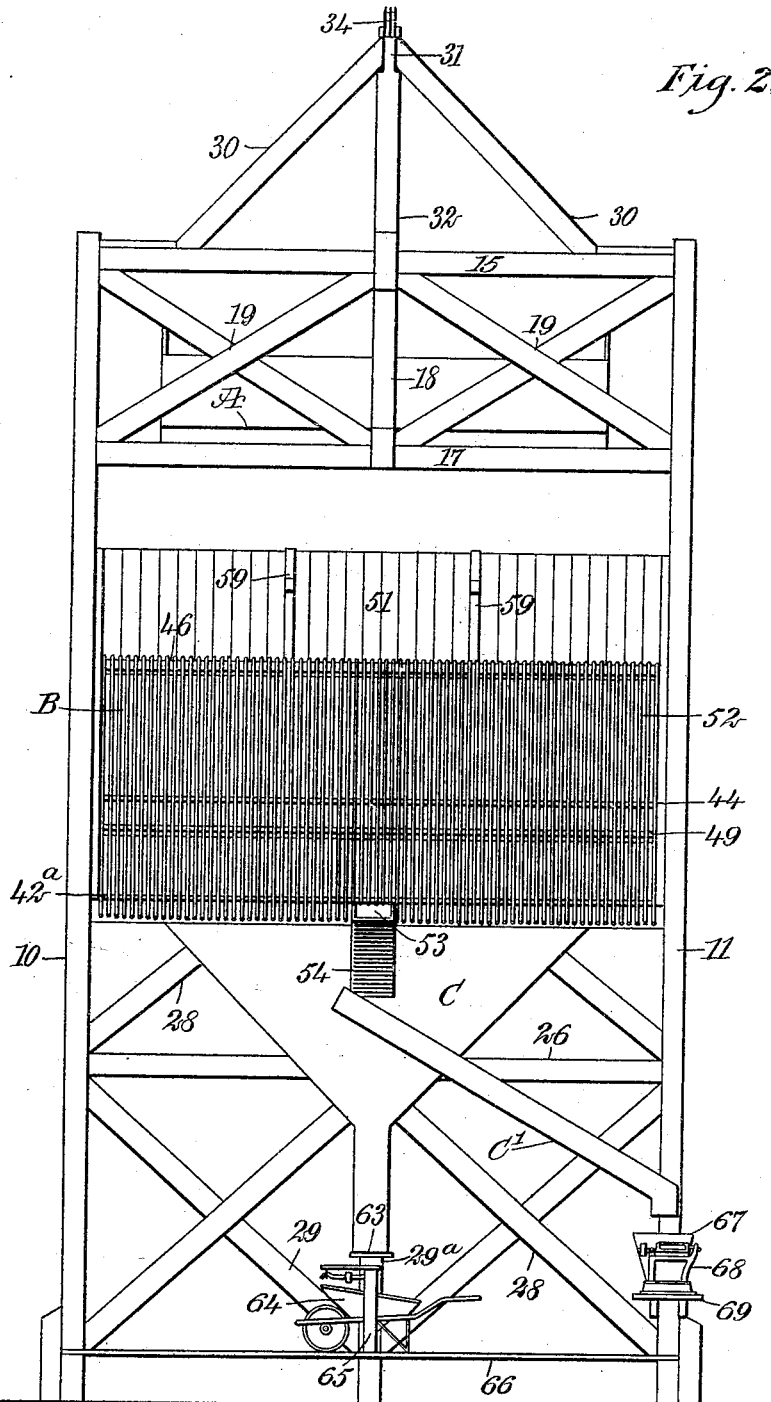

Figure 1 is a side elevation of the structure; Fig. 2 is a front elevation of the same; Fig. 3 is a vertical central section through the structure and a wagon body in dumping position, illustrating the main screen chute in discharge position in full lines and in a partially folded position in dotted lines and fully folded position in broken lines; Fig. 4 is a plan view of the main or screen chute drawn upon an enlarged scale; and Fig. 5 is a detail view of the prop employed for holding the receiving end of the main chute elevated above its pivotal connection with the frame of the structure.

The frame of the structure may be made in various ways, preferably, however, it is rectangular, as is shown, and is also built as is illustrated in the drawings, wherein it consists of front uprights 10 and 11, corresponding rear uprights 12 and 13, upper side cross bars 14, and corresponding front and rear cross bars 15, together with lower side connecting bars 16 and corresponding front and rear bars 17. The front cross bars 15 and 17 are connected at their central portions by a vertical beam 18 forming panels which are braced by cross braces 19, as is shown in Fig. 2, and this construction may be and usually is duplicated at the rear of the frame structure, while the sides between the side cross bars 14 and 16 are strengthened by cross braces 20.

At a point below the forward cross bar 17, preferably between the center of the structure at the front and its lower end, a sill 21 is made to connect the front uprights 10 and 11, which sill, as is shown particularly in Fig. 3, has its upper face downwardly and outwardly inclined, and the side portions of the frame are braced at this point by horizontal beams 22 corresponding in position to the sill 21.

At the rear of the structure between the side cross bars 16 and 22 a rear cross bar 23 is located and the rear portion of the structure may be braced in any suitable or approved manner. Slightly below the side cross bars 22, side beams 24 extend from the uprights 10 and 13, and 11 and 12, and these beams 24 extend out beyond the front face of the structure, as is illustrated in Figs. 1 and 3, the upper faces of said beams at their outer ends being inclined, as is shown at 25 in the drawings, and the outwardly extending ends of the said beams 24 constitute buffers for the main sieve chute B, to be hereinafter described, and serve to limit the downward movement of said chute at its lower end. The cross bars 16 and 22 are strengthened by cross braces 22ª.

At the front of the structure between the projecting ends of the beams 24 and the bottom thereof, a transverse connecting bar 26 is located, and corresponding transverse connecting bars 26ª are provided for the sides of the structure, the spaces between the side bars 22 and 26ª being braced by cross braces 27, and particularly at the front the space between the cross bar 26 and the beams 24 is braced by cross braces 28 and below the transverse beam 26 cross braces 29 are also provided to strengthen the structure, and these latter cross braces 29 extend down to the scale platform 66 which is at the bottom front portion of the frame.

A-beams 30 are located at the top of the structure just described, extending from points near the sides of the central top portion of the structure to a connection with a ridge bar 31, and brace bars 32 extend from the central portion of the front and rear of said structure to an engagement with the ridge bar 31 and these brace bars 32 are connected by a cross bar 33, as is illustrated in Fig. 1. At the central portion of the ridge bar 31 a pulley 34 is mounted, which pulley is preferably a double pulley, and a single pulley 35 is mounted at the rear end of the said ridge bar, as is also shown in Fig. 1. A cable 36 is secured at one of its ends to the central portion of the upper cross bar 33 and this cable is passed twice around a double pulley in a block 37 located below the cross bar 33 and independent thereof, and twice around the upper pulley 34, from thence being carried to and over the pulley 35 and down to a windlass, drum or like device, whereby to wind up or unwind the cable. The block 37 is provided with a pivoted clevis 38 and chains 39 are connected with this clevis, the chains being adapted to be passed around and beneath a wagon body A, which wagon body is removable from its running gear A'. This wagon body A is provided with longitudinal sills 40 located one at each side of the center and the said wagon body is provided also with a side dump gate 41, as is particularly shown in Fig. 3.

In connection with the frame structure just described and the wagon body A, a screen chute B is employed. This screen chute is of rectangular construction and is adapted to extend within the structure and outward beyond its front and is pivotally connected with the structure. The frame of this screen chute consists of an inner end member 42 an outer end member 42ª and side members 43, together with a partition 44 that connects the side pieces between the center of the frame and the outer end member 42ª, as is illustrated in Figs. 3 and 4. At a point between the center and the outer end of the main screen chute B and at a point to the rear of the partition 44, hinges 45 are secured to the frame and to the upper inner edge of the sill 21. Between the center of the frame of the chute B and its inner end a cross bar 46 is secured at the upper edge portion of its side members 43, and a similar cross bar 47 is located between the partition 44 and the forward end 42ª of the said chute, and immediately below the cross bar 47 another cross bar 48 is secured to the under edges of the side members of the said chute B, and, as is shown in Fig. 4, the lower cross bar 48 extends out beyond the outer faces of the side members of the chute and constitutes fenders, which fenders when the chute is in its discharge position, as is illustrated in Fig. 3, engage with the inclined or beveled outer edges 25 of the beams 24, as is also shown in Fig. 3. A second lower cross bar 49 connects the side members 43 of the chute at a point to the rear of the partition 44, but the cross bar 49 at its under face is flush with the lower edges of the side members 43, as is also shown in Fig. 3, and another cross bar 50 extends from one side member 43 to the other between the cross bar 49 and the inner end member 42 of the frame of the chute, but the said cross bar 50 is located between the upper and the lower edges of the side members of the chute, as is shown also in Fig. 3.

An apron 51 of any approved construction is secured at its inner end to the upper edge of the inner end member 42 of the chute frame, and extends downward and outward in engagement with the upper faces of the cross bars 50 and 49, as is shown in Fig. 3, terminating at its outer end at a point in the frame which will bring the said outer end of the apron 51 in engagement with the inclined face of the sill 21 when the chute is in discharge position. A series of rods 52 is usually arranged in parallelism a suitable distance apart at the top portion of the frame, extending from the upper cross bar 46 over the partition 44, the second upper cross bar 47 and over and beyond the outer end member 42ª of the frame, as is shown in Figs. 3 and 4. These bars constitute the screen for the chute and it will be understood that the screen section employed may be of reticulated or perforated material, if so desired, but preferably the rod construction is employed.

At the central portions of the outer projecting end of the screen section 52 an opening 53 is produced, as is shown in Fig. 4, which will permit a certain quantity of the material passing over the screen section to drop down through the said opening 53 and enter a conductor 54 that is located immediately below the said opening 53, which conductor has a hinge connection 55 with the under edge portion of the outer end member 42ª of the chute B, as is shown particularly in Figs. 1 and 3. This conductor is usually open at the top and at both ends but its top may be closed if so desired. The conductor 54 occupies a position which is at an acute angle to the frame of the chute and the said conductor extends in a downward and inward direction to the front of the frame of the structure. A second apron 56 extends from the upper edge of the outer end member 42ª of the chute downward and inward over the upper face of the fender cross bar 48, the inclination of this latter apron being the reverse of the inclination of the apron 51, and a space 57 intervenes the inner or discharge end of the apron 56 and the outer or discharge end of the apron 51 and a space likewise intervenes the discharge end of the apron 56 and the front of the frame structure when the chute B is in discharge position. The apron 56 forms an inclined pocket B′ at the lower end or delivery end of the chute B, which pocket is open at its inner end being otherwise closed.

The chute B when not in use occupies a vertical position adjacent the inner face of the front of the frame structure, as is shown in broken lines in Fig. 3, and in Fig. 3 the position of the screen chute B is also shown in dotted lines when it reaches a point between its upper or delivery position and its inwardly folded position. When the sieve chute B is in its folded position within the frame structure it can be drawn out to occupy the diagonal position shown in full lines in Fig. 3, which is its discharge position, by means of a cable 58. This cable is connected with the outlet end of the conductor 54 and is then carried upward over a suitable guide secured to the fender bar 48 and down to an engagement with the windlass or like mechanism. The screen chute it will be observed is so pivoted in the frame structure that the majority of its length is within the said structure, but a short portion extending out therefrom, when the chute is in discharge position, therefore the entire structure may be erected quite close to the track.

Buffers 59 are located at each side of the center of the apron 51 of the chute B adjacent its upper edge, as is shown in Figs. 3 and 4, and these buffers are engaged by one of the sills 40 of the wagon body A. When a wagon body is made to rest on the chute B for the purpose of having the load dumped therefrom, and just prior to dumping, the side drop gate 41 will open and will extend over the upper end portion of the screen section 52 of the said chute, as hereinafter more fully described.

A hopper C, preferably funnel-shaped and rectangular in cross section, is located at the front lower portion of the frame structure, and the upper end 60 of this hopper is outwardly and upwardly curved so that the said end is flared to receive the greatest possible quantity of material without spilling. The outer face of the hopper at its upper end is secured to a cross bar 61 connecting the forwardly projecting ends of the beams 24, and the inner upper side portion 62 of the hopper is carried up to the outer edge of the inclined face of the sill 21 on which the chute is pivoted and is secured to a board 62ª, or its equivalent, connected to the said sill 21 and to the beams 24, if desired. The hopper C is provided at its lower end with a valve 63 of any approved type, whereby to regulate its discharge, and the material discharged from the hopper is received in a receptacle 64, a wheel-barrow, for example, that is supported on the scale 65 on the aforesaid front platform 66. A spout C′ is attached to the outer face of the hopper C, the upper end of which spout is in position to receive material from the conductor 54, and the spout C′ extends diagonally and downwardly along the outer face of the hopper, as is shown in Fig. 2, its delivery end being over a receptacle 67 located on a scale 68, but this latter scale 68 is on a platform 69 independent of the platform 66.

The upper end of the screen chute B is held elevated so that the said chute will be downwardly and outwardly inclined when in operative position, by means of a prop D, shown in detail in Fig. 5, and in position in Fig. 3. This prop may be of any approved construction, but is preferably made as illustrated, consisting of upper and lower parallel side bars 70 and 71, end bars 72 and brace bars 73, the end portions 70ª of the upper cross bar 70 being made to extend beyond the side members or bars 72, and at the rear of each side member or bar 72 a batten or stop 74 is secured that extends up beyond the upper cross bar or member 70ª. This prop at its lower end portion is connected with the rear intermediate beam 23 by means of hinges 77 of any approved type, and a cable 75 is attached to the upper member of the prop, which cable extends down over a pulley 76 conveniently located and the lower end of the cable is connected with any type of winding mechanism or it may be operated directly by hand if desired. When the prop is in working position it is directly beneath the inner end of the chute B, as is shown in full lines in Fig. 3. The stops 74 engage with the outer face of the inner end member 42 of the chute, and when the prop is drawn from beneath the chute it is free to drop by gravity since its inner end is the heaviest, and the prop as it is drawn to the rear is prevented from passing too far through the structure by reason of the end projections 70ᵃ of the prop engaging with near-by uprights of the frame.

In the operation of this device, the body A of the wagon is lifted from the running gear A', the latter being located at the bottom of the frame structure, as is shown in Fig. 1, and the wagon body is lifted up by means of the chains 39 or whatever other device may be employed for the purpose, but the lifting device connected directly with the wagon body is likewise connected with the pivoted clevis 38, so that by drawing downward on the cable 36 the wagon body loaded is carried up to the upper portion of the structure, as is shown in Fig. 2; then the main screen chute B is brought up to its usual position shown in positive lines in Fig. 3, and the prop is permitted to drop to a supporting position relatively to the chute, as is also shown in positive lines in Fig. 3. Then the wagon body A is permitted to drop until it rests upon the upper portion of the screen chute, as is shown in Fig. 3, one of its sills 40 bearing against the buffers 59, thus preventing the wagon body from sliding from the chute when the lifting device has been released sufficiently to enable the wagon body to assume a corresponding inclination to that of the chute. When this point is reached, the weight of the contents of the wagon body will open the drop gate 41 and the contents will be delivered to the screen section 52 of the chute, and the dirt which passes through the meshes of the screen to the partition 44 will travel down the apron 51 and be delivered into the hopper C and deposited by said hopper in the receptacle 64. Any foreign matter that may pass through the sieve section after the material has passed the partition 44, will be received by and retained in the pocket B' of the chute B, and a certain quantity of material out of the clean material will escape through the opening 53 into the conductor 54 and be conveyed to the spout C', which in turn will deliver it to the receptacle 67 on the auxiliary scale 68. Thus in the receptacle 67 will be received a sample of the material that is loaded into the car E directly from the sieve section 51, and the weight of the said samples will be obtained. When the load has been entirely discharged the body of the wagon is again elevated, the prop is carried from beneath the chute and the chute will return to its inner folded position, but in assuming this position the pocket B' will be brought mouth downward and any material that may be in said pocket will also be delivered into the hopper C and will be weighed with the other material delivered thereto by the apron 51. It will be observed that the material is not only clean but that the weight of the tare is accurately obtained, enabling the net weight of a load to be positively determined.

The machine is very simple for one of its character and can be readily operated by few attendants.

Having thus described our invention, we claim as new and desire to secure by Letters Patent,—

1. In a wagon dump, a skeleton structure, a hoist for the wagon body carried thereby, a screen chute pivoted upon the structure, means carried by the chute for supporting the wagon body, a hinged prop for the inner end of the chute whereby to hold it in discharge position, means for operating the prop, and means for conducting foreign matter from the chute.

2. In a wagon dump, a skeleton structure, a screen chute pivoted to the structure extending partially within and partially without the same, a hinged prop for holding the chute in discharge position, said prop being provided with stops for limiting its swinging movement, means for operating the prop, and dust conducting members located beneath the screen section of the chute and carried thereby.

3. In a wagon dump, a skeleton structure a screen chute pivoted to the structure and extending partially within and partially without the same, said chute being provided with a dust conducting apron beneath a portion of its screen section, and a pocket beneath another portion of the screen section, the outlet for the pocket facing the outlet end of the apron, whereby the dust in the pocket will be discharged therefrom as the chute moves from discharging position.

4. In a wagon dump, a skeleton structure, a screen chute pivoted to the structure and extending partially within and partially without the same, said chute being provided with a dust conducting apron beneath a portion of its screen section, and a pocket beneath another portion of the screen section, the outlet for the pocket facing the outlet end of the apron, a receiver for the dust from the apron and pocket, the dust from the apron entering the receiver while the screen chute is in discharge position, and the dust from the pocket entering the receiver as the chute is moved from discharge position, a prop for temporarily holding the chute in discharge position, and independent manipulating devices for the chute and the prop.

5. In a wagon dump, a structure having a chamber therein for the upward passage of a wagon body, a screen chute pivoted to the said structure extending further within the same than without, the said screen chute consisting of an apron extending from its inner end downward in direction of its outer end, a partition in front of the delivery end of the said apron, a second apron located at the outer end portion of the said chute, having an opposite inclination to the inclination of the first named apron, forming a pocket in the chute, the outlet whereof is opposite yet below the outlet end of the first named apron, and a screen section extending over the major portion of the first apron and over the entire portion of the second apron forming the said pocket, the latter apron being in advance of the said partition, and means for bringing the said chute to a discharge position.

6. In a wagon dump, the combination with a frame and a hoist carried thereby, of a screen chute pivoted to the said frame at a point between its center and one of its ends, the shorter end of the chute extending without the frame and its longer end within the frame, a screen section for the said chute, a partition beneath the said screen section, an apron located at the inner end portion of the said chute extending beneath the screen to a point near the said partition, the said apron having downward and outward inclination when the chute is in discharge position, a second apron located at the outer end of the said chute having a downward and inward inclination, the outlet end of the inwardly inclined apron being adjacent the corresponding end of the outwardly inclined apron, a hinged prop for the inner end of the chute whereby to hold it in discharge position, means for operating the said prop, means for carrying the said chute to discharge position, and a hopper located beneath the discharge ends of the two aprons.

7. In a wagon dump, the combination with a frame, a screen chute pivoted within the frame between its center and its outer end, the said chute comprising a body frame, a partition therefor near the outer end, an apron secured at the outer portion of the inner end of the frame, and extending down to the lower edge thereof adjacent said partition, a second apron located at the outer end of the frame of the chute extending from the upper edge thereof downward in direction of the opposing apron, the outlet ends of the two aprons being opposite each other yet spaced apart, and a sieve section extending partially over the inner apron and entirely over the outer apron, the said sieve section being provided with an enlarged and unobstructed opening therein near its discharge end, a hopper adapted to receive material from the two aprons, a conductor located at the delivery end of the chute opposite the enlarged opening therein, and a trough located beneath the conductor and adapted to receive material therefrom.

8. In a wagon dump, a frame structure, and a screen chute pivoted in the said frame structure and extending partially within and partially without the same, the said chute comprising a frame, a screen section on the frame, a transverse partition in the frame, and oppositely inclined dust conducting aprons in the frame beneath the screen section and on opposite sides of the partition, the outlet ends of the two aprons being adjacent and opposite each other.

9. In a wagon dump, the combination with a frame structure, of a chute pivoted upon said structure extending farther within than without the same, the said chute comprising a frame, an upper screen section on the frame, and lower dust conducting aprons in the frame beneath the screen section, the two aprons having inclination in opposite directions with their outlet ends adjacent and opposite each other, a partition dividing the said chute between the said aprons, a hopper carried by said structure adapted to receive material from the two aprons, and means for bringing the chute to a downwardly and outwardly inclined position, and means for temporarily retaining the said chute in said position.

10. The combination with a frame structure, of a chute pivoted therein between its outer end and its center, being adapted to assume a downwardly and outwardly inclined position in discharging and a vertical position within the frame structure when not in use, the said chute comprising a frame, an upper screen section on the frame, and dust conducting aprons located in the frame beneath the screen section and inclined in opposite directions, the outlet end of one apron terminating within the frame and the outlet end of the other below the frame, said outlet ends being opposite one another yet spaced apart, and a hopper adapted to receive material from both aprons.

11. In a wagon dump, the combination of a frame structure, a chute pivoted therein between its center and its outer end, the said chute being provided with a partition located forward of its pivot point, a dust conducting apron located at each side of the said partition, the aprons being inclined in opposite directions with their outlet ends opposite and in different planes, and a screen section located above the aprons and having an enlarged opening at the center of its outer end, a conductor pivoted at the outer end of the chute at the said enlarged opening, a trough receiving material from the conductor, and a hopper receiving material from the aprons.

12. In a wagon dump, the combination with a support and a chute therein, the said chute being provided with a screen section and a transverse partition, of a dust conducting apron and a dust receiving pocket below the screen section on opposite sides of the partition, the outlet end of the pocket and the outlet end of the apron being opposite yet spaced apart, the said chute being provided with an enlarged opening at the center of the delivery end of its screen section, and a conductor connected with the discharge end of the chute, being in communication with the screen section at the enlarged opening therein.

13. In a wagon dump, a frame, a hoist for a wagon body, a screen chute pivoted intermediate of its ends to the frame, said chute being provided with oppositely inclined aprons, one wholly within the chute and the other having its discharge end projecting below the chute adjacent to the discharge end of the first apron, said chute being also provided on its upper face at its inner end with buffers for engaging a sill of a wagon body, and means for swinging the chute into an inclined or vertical position.

In testimony whereof we have signed our names to this specification in the presence of two subscribing witnesses.

EDWARD EWEL.
SHERMAN L. CLEMENT.

Witnesses to the signature of Edward Ewel:
    CHAS. G. RYAN,
    LAURA E. RAMSTHEL.

Witnesses to the signature of Sherman L. Clement:
    GEO. E. JOHNSON,
    W. E. GOWEN.